US012727726B2

(12) United States Patent
Jeong et al.

(10) Patent No.: US 12,727,726 B2
(45) Date of Patent: Sep. 8, 2026

(54) CORDLESS VACUUM CLEANER INCLUDING PLURALITY OF BATTERIES AND METHOD FOR CONTROLLING SAME

(71) Applicant: Samsung Electronics Co., Ltd., Suwon-si (KR)

(72) Inventors: Samjong Jeong, Suwon-si (KR); Seho Park, Suwon-si (KR); Sanghoon Bae, Suwon-si (KR); Jiseob An, Suwon-si (KR); Seongu Lee, Suwon-si (KR); Jaeshik Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 18/917,322

(22) Filed: Oct. 16, 2024

(65) Prior Publication Data

US 2025/0031930 A1 Jan. 30, 2025

Related U.S. Application Data

(63) Continuation of application No. PCT/KR2023/007613, filed on Jun. 2, 2023.

(30) Foreign Application Priority Data

Aug. 3, 2022 (KR) ........................ 10-2022-0096748
Nov. 1, 2022 (KR) ........................ 10-2022-0143951

(51) Int. Cl.
*A47L 9/28* (2006.01)
*A47L 5/30* (2006.01)
(Continued)

(52) U.S. Cl.
CPC ............... *A47L 9/2884* (2013.01); *A47L 5/30* (2013.01); *A47L 9/0411* (2013.01);
(Continued)

(58) Field of Classification Search
None
See application file for complete search history.

(56) References Cited

U.S. PATENT DOCUMENTS 11,382,474 B2 7/2022 Lubbers
11,707,176 B2 7/2023 Yamada et al.
(Continued)

FOREIGN PATENT DOCUMENTS

JP 2002-034874 A 2/2002
JP 2003-219991 A 8/2003
(Continued)

OTHER PUBLICATIONS

JP 2019034139 English translation accessed in Feb. 2026. (Year: 2019).*

*Primary Examiner* — Kaj K Olsen
*Assistant Examiner* — Arlyn I Rivera-Cordero
(74) *Attorney, Agent, or Firm* — Jefferson IP Law, LLP

(57) ABSTRACT

A cordless vacuum cleaner is provided. The cordless vacuum cleaner includes a plurality of batteries and a method of controlling the same are provided. The cordless vacuum cleaner includes a main body, a suction fan, a suction motor arranged inside the main body and configured to rotate the suction fan, a charging circuit configured to charge the main body, a plurality of batteries charged and discharged through the charging circuit, memory storing one or more computer programs, and one or more processors communicatively coupled to the suction motor, the charging circuit, the plurality of batteries, and the memory, wherein the one or more computer programs include computer-executable instructions that, when executed by the one or more processors individually or collectively, cause the cordless vacuum cleaner to, based on state information about each of the plurality of batteries, control discharge of each
(Continued)

of the plurality of batteries, and the state information includes a battery discharge amount of each of the plurality of batteries.

18 Claims, 9 Drawing Sheets

(51) Int. Cl.
*A47L 9/04* (2006.01)
*A47L 9/24* (2006.01)
*H02J 7/00* (2026.01)

(52) U.S. Cl.
CPC ............. *A47L 9/0477* (2013.01); *A47L 9/246* (2013.01); *H02J 7/865* (2026.01)

(56) References Cited

U.S. PATENT DOCUMENTS 11,877,713 B2 1/2024 Kwak et al.
2015/0366425 A1* 12/2015 Lee ....................... A47L 9/2868 15/300.1
2016/0088992 A1 3/2016 Lee et al.
2016/0095488 A1* 4/2016 Lee ....................... A47L 9/2831 15/319
2018/0271344 A1 9/2018 Han et al.
2019/0014962 A1* 1/2019 Hyun ........................ A47L 9/20
2019/0045995 A1 2/2019 Sauerwald et al.
2020/0201348 A1* 6/2020 Leech ................ B60W 60/0011
2022/0104674 A1 4/2022 Xie et al.
2022/0346609 A1 11/2022 Kwak et al.
2022/0354327 A1 11/2022 Kim et al.
2023/0329499 A1 10/2023 Lee et al.
2023/0329503 A1 10/2023 Lee et al.

FOREIGN PATENT DOCUMENTS

| | | | |
|---|---|---|---|
| JP | 2014-200406 | A | 10/2014 |
| JP | 2019-034139 | A | 3/2019 |
| JP | 2021-029729 | A | 3/2021 |
| KR | 10-2008-0000390 | A | 1/2008 |
| KR | 10-1027314 | B1 | 4/2011 |
| KR | 10-1377321 | B1 | 3/2014 |
| KR | 10-1668520 | B1 | 10/2016 |
| KR | 10-1718233 | B1 | 3/2017 |
| KR | 10-1926196 | B1 | 12/2018 |
| KR | 10-2035682 | B1 | 10/2019 |
| KR | 10-2020-0119063 | A | 10/2020 |
| KR | 10-2021-0039175 | A | 4/2021 |
| KR | 10-2309302 | B1 | 10/2021 |

* cited by examiner

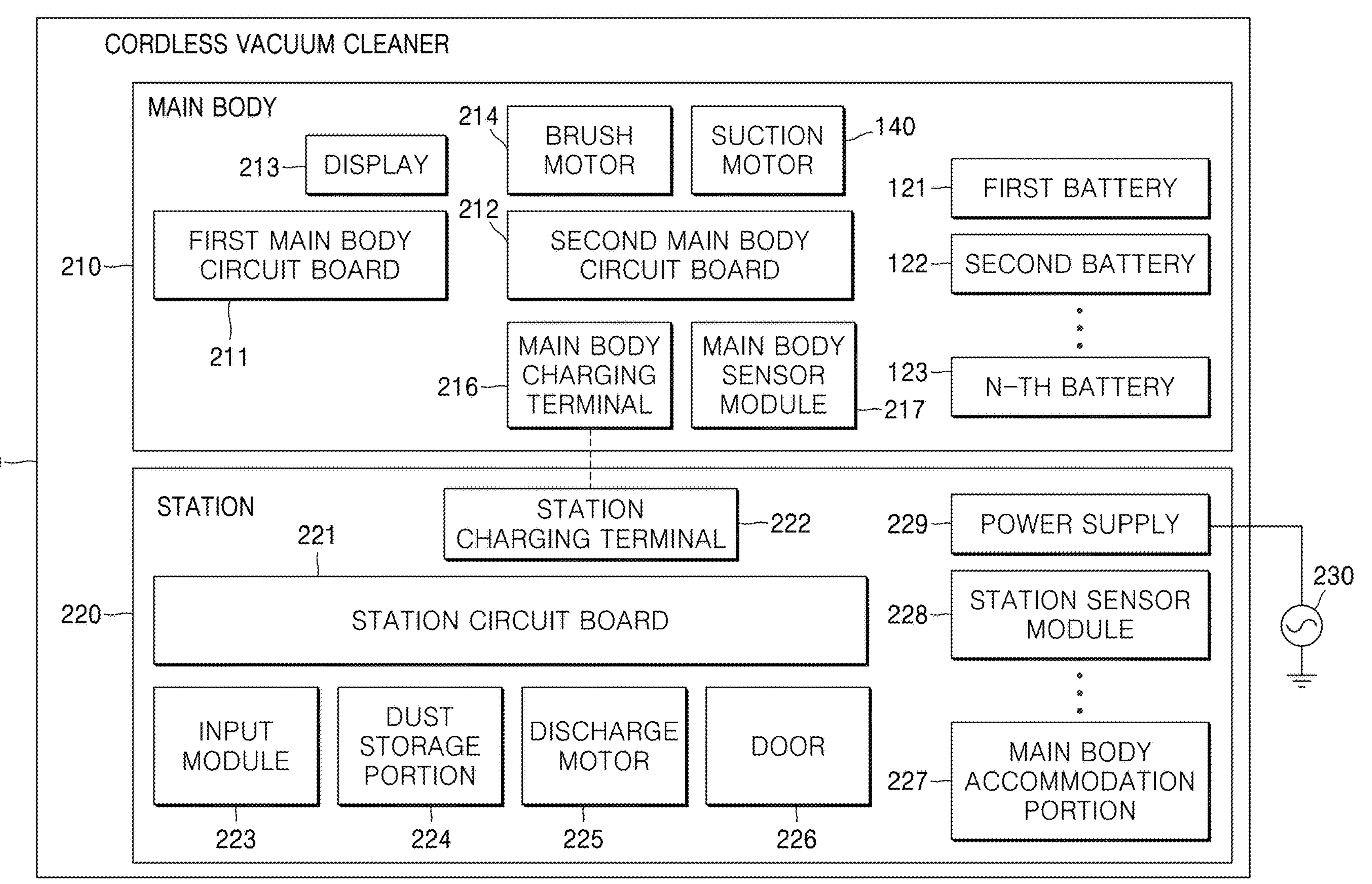
FIG. 2
CORDLESS VACUUM CLEANER
MAIN BODY
DISPLAY
FIRST MAIN BODY CIRCUIT BOARD
BRUSH MOTOR
SUCTION MOTOR
SECOND MAIN BODY CIRCUIT BOARD
MAIN BODY CHARGING TERMINAL
MAIN BODY SENSOR MODULE
FIRST BATTERY
SECOND BATTERY
N-TH BATTERY
STATION
STATION CHARGING TERMINAL
STATION CIRCUIT BOARD
INPUT MODULE
DUST STORAGE PORTION
DISCHARGE MOTOR
DOOR
POWER SUPPLY
STATION SENSOR MODULE
MAIN BODY ACCOMMODATION PORTION
100
210
211
212
213
214
216
217
140
121
122
123
220
221
222
223
224
225
226
227
228
229
230

FIG. 8

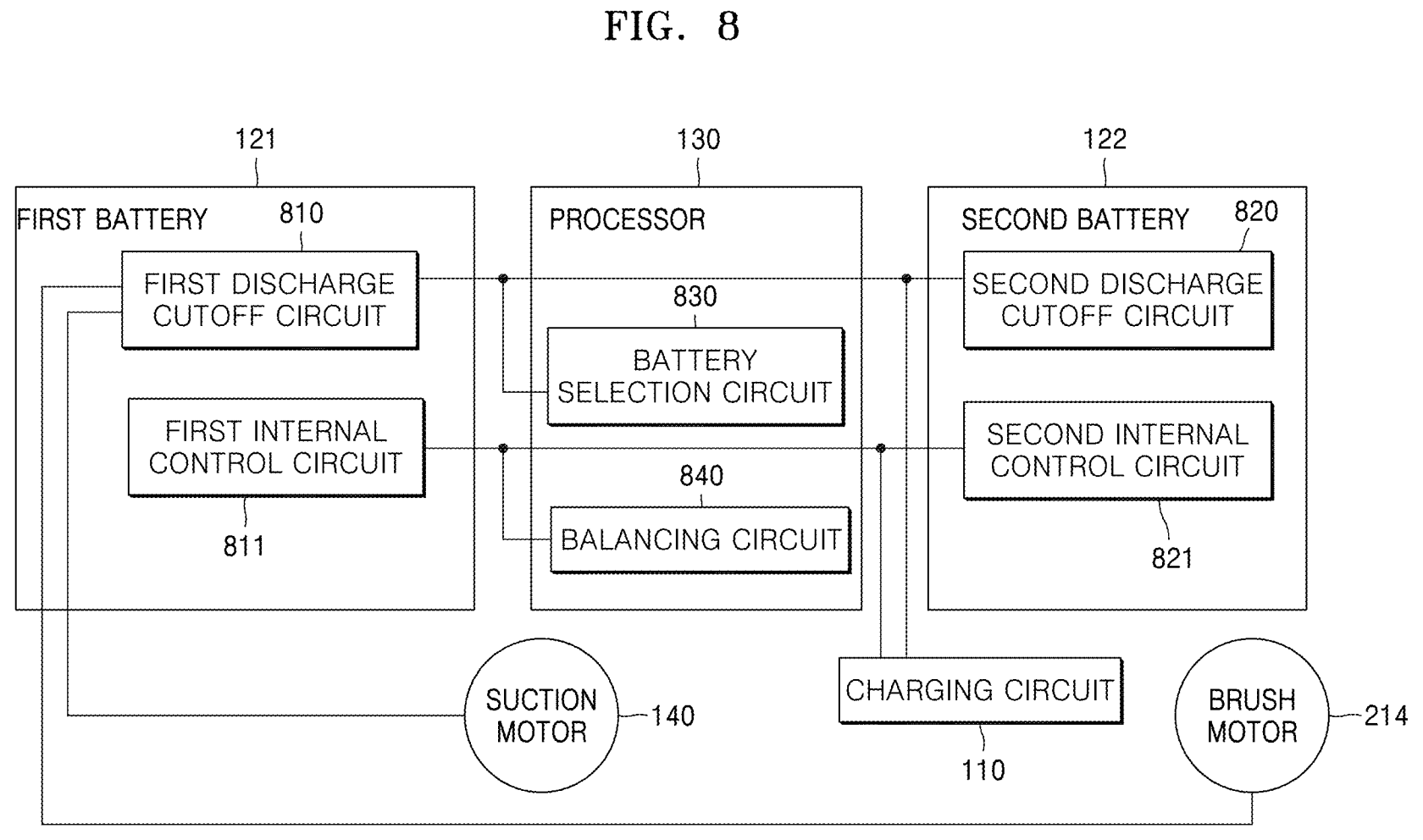

121 FIRST BATTERY
810 FIRST DISCHARGE CUTOFF CIRCUIT
811 FIRST INTERNAL CONTROL CIRCUIT
130 PROCESSOR
830 BATTERY SELECTION CIRCUIT
840 BALANCING CIRCUIT
122 SECOND BATTERY
820 SECOND DISCHARGE CUTOFF CIRCUIT
821 SECOND INTERNAL CONTROL CIRCUIT
110 CHARGING CIRCUIT
140 SUCTION MOTOR
214 BRUSH MOTOR

CORDLESS VACUUM CLEANER INCLUDING PLURALITY OF BATTERIES AND METHOD FOR CONTROLLING SAME

CROSS-REFERENCE TO RELATED APPLICATION(S)

This application is a continuation application, claiming priority under § 365(c), of an International application No. PCT/KR2023/007613, filed on Jun. 2, 2023, which is based on and claims the benefit of a Korean patent application number 10-2022-0096748, filed on Aug. 3, 2022, in the Korean Intellectual Property Office, and of a Korean patent application number 10-2022-0143951, filed on Nov. 1, 2022, in the Korean Intellectual Property Office, the disclosure of each of which is incorporated by reference herein in its entirety.

BACKGROUND

1. Field

The disclosure relates to a cordless vacuum cleaner including a plurality of batteries and a method of controlling the same.

2. Description of Related Art

A power plug may be connected to a power socket such that a corded vacuum cleaner performs a suction function while in operation. In contrast, a cordless vacuum cleaner may perform the charging of electric energy while on standby and perform a suction function by using the charged electric energy while in operation. Accordingly, when a user uses the corded vacuum cleaner, the user needs to connect a power plug to a power socket, and thus, the movement of the corded vacuum cleaner is restricted by a power line connecting the power plug to a vacuum cleaner main body. However, when the user uses the cordless vacuum cleaner, the user does not need to connect the power plug to the power socket, thus, the movement of the cordless vacuum cleaner may not be restricted by the power line.

The cordless vacuum cleaner may include a battery storing charged electric energy. As the capacity of the battery increases, the battery may store greater amounts of electric energy. As the amount of stored electric energy increases, the usage time for the cordless vacuum cleaner may increase, and the suction performance of the cordless vacuum cleaner may be improved. In addition, as the usage efficiency of the battery increases, the usage time for the cordless vacuum cleaner may increase, and the suction performance of the cordless vacuum cleaner may be improved.

A battery of a cordless vacuum cleaner of the related art may be placed in a specified area of a vacuum cleaner main body. When the capacity of the battery is increased, the weight of the specified area of the vacuum cleaner main body increases, which may cause inconvenience to a user when moving the vacuum cleaner main body. In addition, the cordless vacuum cleaner of the related art may have one battery placed in the vacuum cleaner main body. When a single battery is placed in the vacuum cleaner main body, the usage efficiency of the battery may be limited.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cordless vacuum cleaner including a plurality of batteries and a method of controlling the same.

Additional aspects will be set forth in part in the description which follows and, in part, will be apparent from the description, or may be learned by practice of the presented embodiments.

In accordance with an aspect of the disclosure, a cordless vacuum cleaner is provided. The cordless vacuum cleaner includes a main body, a suction fan, a suction motor arranged inside the main body and configured to rotate the suction fan, a charging circuit configured to charge the main body, a plurality of batteries charged and discharged through the charging circuit, memory storing one or more computer programs, and one or more processors communicatively coupled to the suction motor, the charging circuit, the plurality of batteries, and the memory, wherein the one or more computer programs include computer-executable instructions that, when executed by the one or more processors individually or collectively, cause the cordless vacuum cleaner to, based on state information about each of the plurality of batteries, control discharge of each of the plurality of batteries, and wherein the state information includes a battery discharge amount of each of the plurality of batteries.

In accordance with another aspect of the disclosure, a method of controlling a cordless vacuum cleaner including a main body, a suction fan, a suction motor arranged inside the main body and configured to rotate the suction fan, a charging circuit configured to charge the main body, a plurality of batteries charged and discharged through the charging circuit, memory storing one or more computer programs, and one or more processors communicatively coupled to the suction motor, the charging circuit, the plurality of batteries, and the memory is provided. The method includes receiving, by the processor, state information about each of the plurality of batteries included in the cordless vacuum cleaner, wherein the one or more computer programs include computer-executable instructions that, when executed by the one or more processors individually or collectively, cause the cordless vacuum cleaner to, based on the state information about each of the plurality of batteries, control discharge of each of the plurality of batteries, and wherein the state information include a battery discharge amount of each of the plurality of batteries.

In accordance with another aspect of the disclosure, one or more non-transitory computer-readable storage media storing computer-executable instructions that, when executed by a processor individually or collectively, cause a cordless vacuum cleaner comprising a main body, a suction fan, a suction motor arranged inside the main body and configured to rotate the suction fan, a charging circuit configured to charge the main body, a plurality of batteries charged and discharged through the charging circuit, and the processor configured to control each of the plurality of batteries, to perform operations are provided. The operations include receiving, by the processor, state information about each of the plurality of batteries included in the cordless vacuum cleaner, and based on the state information about each of the plurality of batteries, controlling discharge of each of the plurality of batteries, and wherein the state information comprises a battery discharge amount of each of the plurality of batteries.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram of a main body and a station of a cordless vacuum cleaner, according to an embodiment of the disclosure;

FIG. 8 is a block diagram illustrating a control flow of a cordless vacuum cleaner, according to an embodiment of the disclosure.

The same reference numerals are used to represent the same elements throughout the drawings,

DETAILED DESCRIPTION

Figure 1:
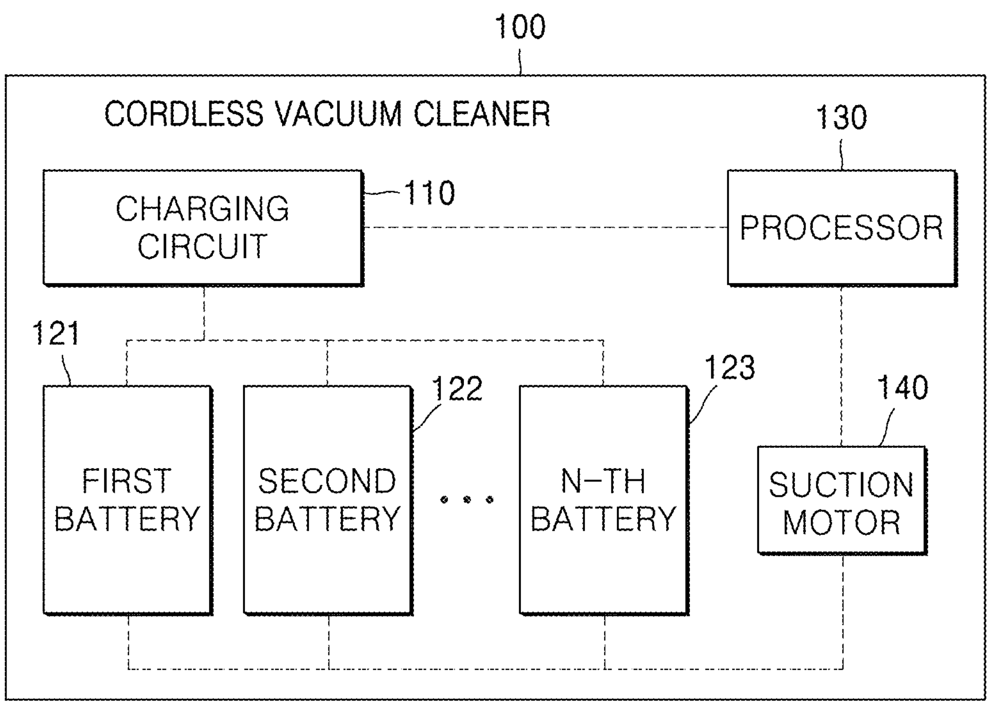
FIG. 1 is a block diagram of a cordless vacuum cleaner according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined, by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms used in the disclosure are those general terms currently widely used in the art based on functions in regard to embodiments of the disclosure, but the terms may vary according to the intention of those of ordinary skill in the art, precedents, or new technologies in the art. Furthermore, some particular terms may be arbitrarily selected by the applicant, and in this case, the meaning of the selected terms will be described in the detailed description of the disclosure. Thus, the terms used in the disclosure should be understood not as simple names but based on the meaning of the terms and the overall description of the disclosure.

Throughout the disclosure, when a portion "includes" or "comprises" a component, another component may be further included, rather than excluding the presence of the other component, unless otherwise described. In addition, terms used in the disclosure, such as ". . . or/er", ". . . module", or the like, refer to units that perform at least one function or operation, and the units may be implemented as hardware or software or as a combination of hardware and software.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

According to an embodiment of the disclosure, a cordless vacuum cleaner may be provided, in which a plurality of batteries are arranged at different positions of the cordless vacuum cleaner such that the weights of the batteries are distributed, thereby allowing a user to move a main body more easily when using the cordless vacuum cleaner.

According to an embodiment of the disclosure, a cordless vacuum cleaner may be provided, in which at least one battery is selected from among a plurality of batteries based on state information to operate the cordless vacuum cleaner, and thus, the usage efficiency of the battery is increased.

FIG. 1 is a block diagram of a cordless vacuum cleaner according to an embodiment of the disclosure.

Referring to FIG. 1, a cordless vacuum cleaner 100 may perform charging of electric energy while on standby and perform a suction function by using the charged electric energy while in operation. Accordingly, when the cordless vacuum cleaner 100 is used, a power plug does not need to be connected to a power socket, and thus, movement of the cordless vacuum cleaner 100 may not be restricted by a power line when in use. The cordless vacuum cleaner 100 may include a charging circuit 110, a plurality of batteries 121, 122, and 123 including a first battery 121, a second battery 122, and an N-th battery 123 (where N is a natural number of 3 or more), a processor 130, and a suction motor 140.

The charging circuit 110 may charge a main body of the cordless vacuum cleaner 100. The charging circuit 110 may receive electric power energy from an external power source. The main body of the cordless vacuum cleaner 100 may be mounted on a station where a power plug is connected to a power socket. The station may receive electric power energy from the external power source. When the main body of the cordless vacuum cleaner 100 is mounted on the station, the charging circuit 110 may receive electric power energy from the external power source through the station. The charging circuit 110 may charge the main body of the cordless vacuum cleaner 100 by using the received electric power energy. In an embodiment of the disclosure, the charging circuit 110 may convert the received electric power energy into power suitable for the main body of the cordless vacuum cleaner 100 and transmit the power to the main body of the cordless vacuum cleaner 100. In an embodiment of the disclosure, the charging circuit 110 may include a capacitor circuit configured to smooth out electric power energy received from the outside, and a transformer configured to convert electric power energy received from the outside into power suitable for the main body of the cordless vacuum cleaner 100.

The charging circuit 110 may be electrically connected to the first battery 121, the second battery 122, the N-th battery 123, and the processor 130. The charging circuit 110 may charge the first battery 121, the second battery 122, and the N-th battery 123 by using the electric power energy. In an embodiment of the disclosure, the charging circuit 110 may evenly charge the first battery 121, the second battery 122, and the N-th battery 123. In an embodiment of the disclosure, under control by the processor 130, the charging circuit 110 may selectively charge at least one of the first battery 121, the second battery 122, and the N-th battery 123. In an embodiment of the disclosure, the charging circuit 110 may individually charge a battery having a state of charge (SOC) lower than or equal to a specified SOC from among the first battery 121, the second battery 122, and the N-th battery 123. In an embodiment of the disclosure, the charging circuit 110 may suspend charging of a battery having a SOC higher than the specified SOC from among the first battery 121, the second battery 122, and the N-th battery 123.

The first battery 121, the second battery 122, and the N-th battery 123 may be electrically connected to the charging circuit 110. The first battery 121, the second battery 122, and the N-th battery 123 may receive electric power energy from the charging circuit 110. The first battery 121, the second battery 122, and the N-th battery 123 may store electric energy received from the charging circuit 110.

The first battery 121, the second battery 122, and the N-th battery 123 may be electrically connected to the suction motor 140. The first battery 121, the second battery 122, and the N-th battery 123 may output the stored electric energy to the suction motor 140. The first battery 121, the second battery 122, and the N-th battery 123 may drive the suction motor 140. The first battery 121, the second battery 122, and the N-th battery 123 may control power output to the suction motor 140.

The processor 130 may be electrically connected to the charging circuit 110. The processor 130 may control all operations of the charging circuit 110. In an embodiment of the disclosure, while the charging circuit 110 charges the first battery 121, the second battery 122, and the N-th battery 123, the processor 130 may adjust the amount and ratio of power flowing from the charging circuit 110 to the first battery 121, the second battery 122, and the N-th battery 123.

The processor 130 may be electrically connected to the suction motor 140. The processor 130 may control all operations of the suction motor 140. The processor 130 may control driving speed of the suction motor 140.

The suction motor 140 may provide suction power to perform a suction function of the cordless vacuum cleaner 100. The suction motor 140 may generate suction power to suck in air by rotating a suction fan or reducing the internal air pressure of the cordless vacuum cleaner 100. The suction motor 140 may adjust the suction power under the control by the processor 130.

The processor 130 may obtain state information about each of the plurality of batteries 121, 122, and 123. The state information may include a battery discharge amount of each of the plurality of batteries 121, 122, and 123. The battery discharge amount of each of the plurality of batteries 121, 122, and 123 may be calculated based on a change in capacity of each of the plurality of batteries 121, 122, and 123, a change in voltage of each of the plurality of batteries 121, 122, and 123, and a usage amount of each of the plurality of batteries 121, 122, and 123. The processor 130 may display, on a display, the battery discharge amount of each of the plurality of batteries 121, 122, and 123.

In an embodiment of the disclosure, the state information about each of the plurality of batteries 121, 122, and 123 may include a life state of each of the plurality of batteries 121, 122, and 123. The life state of each of the plurality of batteries 121, 122, and 123 may refer to a remaining period of time during which each of the plurality of batteries 121, 122, and 123 may operate normally. In an embodiment of the disclosure, the life state may refer to a remaining period of time during which each of the plurality of batteries 121, 122, and 123 may output power while being discharged normally. In an embodiment of the disclosure, the life state may refer to a remaining period of time during which each battery may normally supply power to the main body while having a specified range of discharge amounts. In an embodiment of the disclosure, the life state may be calculated based on a usage period of time for each of the plurality of batteries 121, 122, and 123, a degree of deterioration of each of the plurality of batteries 121, 122, and 123, or a usage pattern of each of the plurality of batteries 121, 122, and 123.

The processor 130 may control discharging of each of the plurality of batteries 121, 122, and 123 based on the state information about each of the plurality of batteries 121, 122, and 123. In an embodiment of the disclosure, the processor 130 may select, from among the plurality of batteries 121, 122, and 123, a battery having the longest life in the state information and operate the cordless vacuum cleaner 100 by using the selected battery. For example, the processor 130 may select, from among the plurality of batteries 121, 122, and 123, a battery having the longest life, discharge the selected battery, and control the selected battery to output power to the suction motor 140. In an embodiment of the disclosure, the processor 130 may suspend the discharging of batteries other than the battery having the longest life among the plurality of batteries 121, 122, and 123. The processor 130 may control the discharging of the plurality of batteries 121, 122, and 123 based on the state information, thereby efficiently outputting power from the plurality of batteries 121, 122, and 123.

Hereinafter, components constituting the main body and the station included in the cordless vacuum cleaner are described with reference to FIG. 2.

FIG. 2 is a block diagram of a main body and a station of a cordless vacuum cleaner according to an embodiment of the disclosure.

Referring to FIG. 2, a main body 210 may be a main apparatus that performs a cleaning function. The station 220 may be a support for holding and charging the main body 210 when the cordless vacuum cleaner 100 is stored. The station 220 may perform a function of discharging dust stored in a dust storage portion of the main body 210 after cleaning.

The main body 210 may include a first main body circuit board 211, a second main body circuit board 212, a display 213, a brush motor 214, a suction motor 140, a main body charging terminal 216, and a main body sensor module 217. The main body 210 may further include other components not shown. For example, the main body 210 may further include a handle portion held by a user in his or her hand when moving the main body 210 or cleaning, a brush portion that assists suction while sweeping the floor, a pipe that connects the handle portion and the brush portion to each other, and an accessory configured to provide additional functions that assist the user in cleaning.

In an embodiment of the disclosure, the first main body circuit board 211 may include a micro controller unit (MCU) and a control circuit. For example, the first main body circuit board 211 may include a communicator configured to perform short-range communication, such as Bluetooth low energy (BLE). The first main body circuit board 211 may perform short-range communication with the station 220. The first main body circuit board 211 may include an input circuit connected to an operation button configured to receive an operation input from a user. The first main body circuit board 211 may receive an operation button input from a user. The first main body circuit board 211 may perform overall control related to the driving of the main body 210 of the cordless vacuum cleaner 100. The first main body circuit board 211 may be connected to the second main body circuit board 212. The first main body circuit board 211 may transmit a control signal to the second main body circuit board 212. The first main body circuit board 211 may be connected to the display 213. The first main body circuit board 211 may transmit driving information about the main body 210 to the display 213 and display the driving information about the main body 210 through the display 213.

In an embodiment of the disclosure, the second main body circuit board 212 may be a sub-circuit board. The second main body circuit board 212 may be connected to the first main body circuit board 211. The second main body circuit board 212 may receive the control signal from the first main body circuit board 211. The second main body circuit board 212 may be connected to the brush motor 214, the suction motor 140, the main body charging terminal 216, and the main body sensor module 217. The second main body circuit board 212 may transmit a control signal to the brush motor 214, the suction motor 140, and the main body sensor module 217. The second main body circuit board 212 may receive power from the main body charging terminal 216. The second main body circuit board 212 may transmit, to the brush motor 214 and the suction motor 140, the power received from the main body charging terminal 216.

In an embodiment of the disclosure, the display 213 may be a small display including a light emitter, such as a light-emitting diode (LED). The display 213 may display the driving information about the main body 210 received from the first main body circuit board 211. The display 213 may display a cleaning operation mode of the main body 210 and an available cleaning time for the main body 210. When a specific event occurs during cleaning, the display 213 may display state information.

In an embodiment of the disclosure, the brush motor 214 may be arranged adjacent to the brush portion of the main body 210. The brush motor 214 may be driven by using the power received from the first main body circuit board 211. The brush motor 214 may rotate the brush portion during rotation driving. The brush motor 214 may rotate the brush portion such that the brush portion cleanly sucks up dust.

In an embodiment of the disclosure, the suction motor 140 may be arranged adjacent to the dust storage portion arranged below the handle portion of the main body 210. The suction motor 140 may be driven by using the power received from the first main body circuit board 211. The suction motor 140 may provide suction power to suck in air into the main body 210 while driving. The suction motor 140 may provide suction power to suck up foreign materials, such as dust and transmit the foreign materials to the dust storage portion.

In an embodiment of the disclosure, the main body charging terminal 216 may receive the power from the station 220. The main body charging terminal 216 may transmit the received power to the brush motor 214 and the suction motor 140 through the second main body circuit board 212.

In an embodiment of the disclosure, the main body sensor module 217 may detect various elements related to the state of the main body 210. The main body sensor module 217 may include a dust container sensor capable of detecting the amount of dust in the dust storage portion and whether a lid is open, a pressure sensor configured to detect a pressure at which the main body 210 sucks in foreign materials, such as dust, and a suction path sensor capable of detecting blockage in a suction path.

In an embodiment of the disclosure, the station 220 may include a station circuit board 221, a station charging terminal 222, an input module 223, a dust storage portion 224, a discharge motor 225, a door 226, a main body accommodation portion 227, a station sensor module 228, and a power supply 229. The station 220 may further include other components not shown. For example, the station 220 may further include a display indicating a charging state of the main body 210.

In an embodiment of the disclosure, the station circuit board 221 may include an MCU and a control circuit. The station circuit board 221 may include a communicator configured to perform short-range communication and long-range communication, such as wireless fidelity (Wi-Fi). The station circuit board 221 may perform short-range communication with the main body 210. The station circuit board 221 may perform short-range communication or long-range communication with portable terminals or devices on Internet of things (IoT). The station circuit board 221 may be electrically connected to the input module 223, the discharge motor 225, the door 226, the station sensor module 228, and the power supply 229. The station circuit board 221 may perform overall control related to the driving of the station 220 of the cordless vacuum cleaner 100. The station circuit board 221 may transmit a control signal to the input module 223, the discharge motor 225, the door 226, the station sensor module 228, and the power supply 229.

In an embodiment of the disclosure, the station charging terminal 222 may transmit power to the main body 210. The station charging terminal 222 may receive the power from the power supply 229. The station charging terminal 222 may transmit, to the main body 210, the power received from the power supply 229. The station charging terminal 222 may be connected to the main body charging terminal 216. The station charging terminal 222 may transmit the power to the main body 210 through the main body charging terminal 216.

In an embodiment of the disclosure, the input module 223 may include an operation button configured to receive an operation input from a user, and an input circuit connected to the operation button. The operation button may receive an input from a user pressing the operation button. The operation button may include a dust discharge operation button. When the user presses the dust discharge operation button, dust stored in the dust storage portion 224 of the station 220 may be discharged. When the main body 210 is mounted, the dust storage portion 224 may store dust stored in the dust storage portion of the main body 210. When the dust stored in the dust storage portion 224 is discharged, the discharge motor 225 may be driven. When the dust stored in the dust storage portion 224 is discharged, the door 226 may be opened.

In an embodiment of the disclosure, the main body accommodation portion 227 may be a space capable of supporting the main body 210 such that the main body 210 may be mounted on the station 220. The station circuit board 221 may detect whether the main body 210 is accommodated in the main body accommodation portion 227. When it is determined that the main body 210 is accommodated in the main body accommodation portion 227, the station circuit board 221 may charge the main body 210.

In an embodiment of the disclosure, the station sensor module 228 may include an accommodation sensor configured to detect that the main body 210 is accommodated in the main body accommodation portion 227, a dust amount sensor configured to detect the amount of foreign materials, such as dust stored in the dust storage portion 224, and a pressure sensor configured to detect a pressure when dust is discharged.

In an embodiment of the disclosure, the power supply 229 may receive electric power energy from an external power source. The power supply 229 may be connected to an alternating current (AC) power source to receive electric power energy. The power supply 229 may convert received AC power into direct current (DC) power having a voltage and current that may be used by the cordless vacuum cleaner 100. For example, the power supply 229 may receive AC power having a voltage of at least about 110 V but no more than about 240 V from the external power source and convert the AC power into DC power having a voltage of 30 V and a current of 1.25 A. The power supply 229 may transmit the converted DC power to the station circuit board 221. The station circuit board 221 may transmit the DC power to the main body 210 through the station charging terminal 222, the DC power being received from the power supply 229.

In an embodiment of the disclosure, the plurality of batteries 121, 122, and 123 may be charged with power transmitted to the main body 210 through the station charging terminal 222. The plurality of batteries 121, 122, and 123 may be discharged under the control by the processor arranged on the first main body circuit board 211 and may output stored power to drive the brush motor 214 and the suction motor 140.

In an embodiment of the disclosure, the plurality of batteries 121, 122, and 123 may each include a battery management system (BMS) circuit. The BMS circuit may monitor a residual capacity and a voltage of each of the plurality of batteries 121, 122, and 123. When the residual capacity of each of the plurality of batteries 121, 122, and 123 is less than or equal to a specified capacity or the voltage of each of the plurality of batteries 121, 122, and 123 is less than or equal to a specified value, the BMS circuit may stop using each battery. The BMS circuit may limit overcharging, overheating, overload, or over-discharging of each of the plurality of batteries 121, 122, and 123.

Hereinafter, the structure of arranging two batteries in the main body of the cordless vacuum cleaner is described with reference to FIG. 3.

Figure 3:
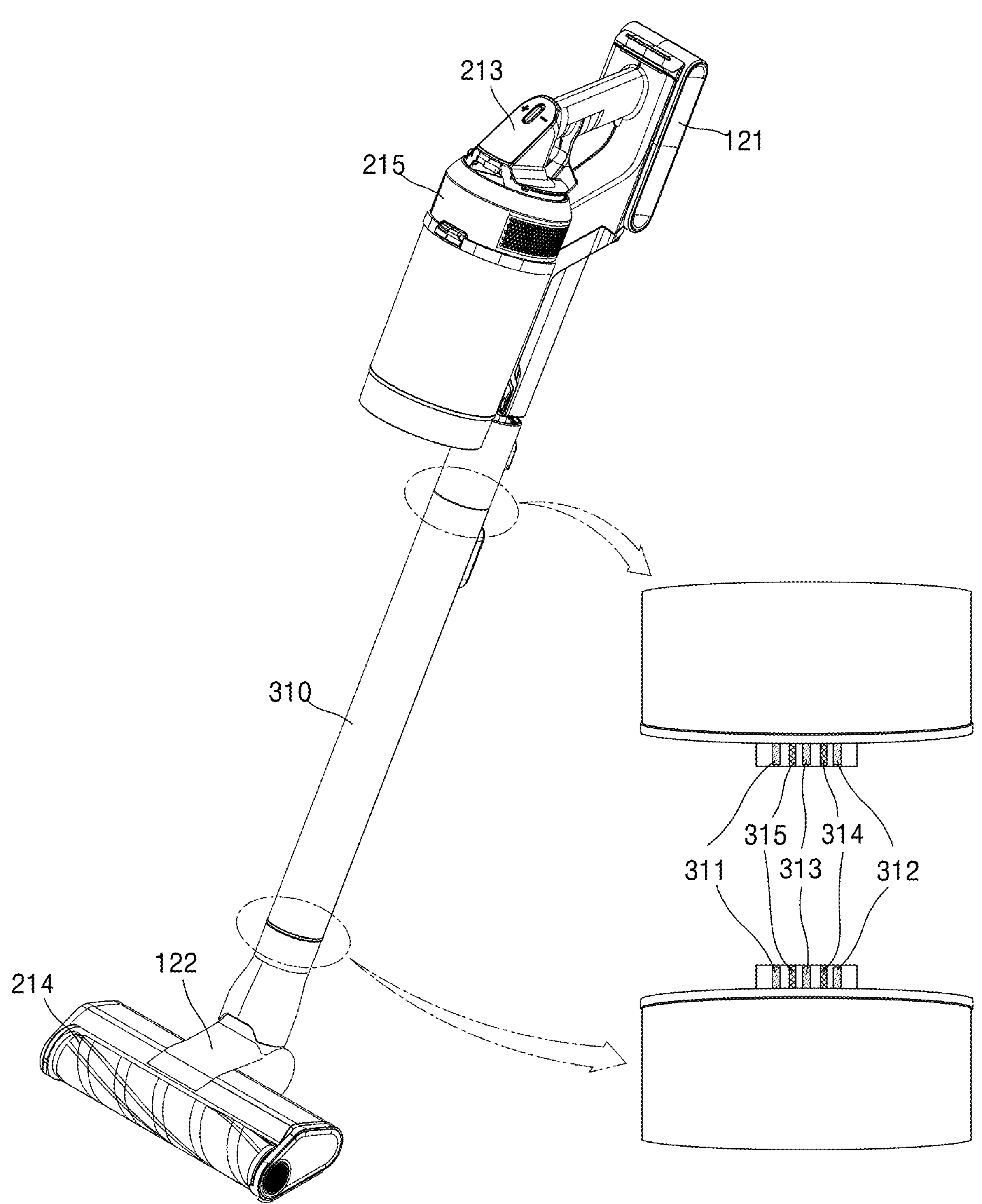
FIG. 3 is a diagram illustrating two batteries arranged in a cordless vacuum cleaner, according to an embodiment of the disclosure.

FIG. 3 is a diagram illustrating two batteries arranged in a cordless vacuum cleaner according to an embodiment of the disclosure.

Referring to FIG. 3, the cordless vacuum cleaner may include a motor. The motor may include a suction motor configured to provide suction power to a main body, and a brush motor 214 configured to rotate a brush of the main body. The brush may be arranged to face the ground at the bottom of the main body. The suction motor may be arranged adjacent to a handle portion of the main body. The suction motor may be arranged in a suction canister upper end 215. The brush motor may be arranged adjacent to a brush portion including the brush.

The first battery 121 may be arranged adjacent to the suction motor. The first battery 121 may be arranged adjacent to the handle portion of the main body. The first battery 121 may be attached to a side of the handle portion opposite to the suction motor. The first battery 121 may be arranged on the side of a user when the user moves the main body of the cordless vacuum cleaner.

The second battery 122 may be arranged adjacent to the brush motor. The second battery 122 may be arranged adjacent to the brush portion of the main body. The second battery 122 may be arranged in a brush accommodation portion that accommodates the brush of the brush portion. The second battery 122 may be arranged in a brush connector that connects the brush of the brush portion to a pipe of the main body.

The first battery 121 may have a first capacity. The second battery 122 may have a second capacity.

In an embodiment of the disclosure, the first capacity of the first battery and the second capacity of the second battery may be at different levels. The different levels may refer to different full charge capacities, different residual capacities, or different internal voltages. Levels of the first capacity and the second capacity may be determined based on a first weight of the first battery and a second weight of the second battery. For example, the second capacity may be greater than or equal to the first capacity. In an embodiment of the disclosure, when the second capacity is greater than the first capacity, the weight of the second battery 122 may be greater than the weight of the first battery 121. When the weight of the second battery 122 is greater than the weight of the first battery 121, the weight of the cordless vacuum cleaner perceived by a user may be reduced.

In an embodiment of the disclosure, the first capacity of the first battery may be equal to the second capacity of the second battery. When the second capacity is equal to the first capacity, a model of the second battery 122 may be identical to a model of the first battery 121. When the model of the second battery 122 is identical to the model of the first battery 121, the compatibility of the batteries may be increased.

To explain about the reduction in the weight of the cordless vacuum cleaner perceived by the user when the weight of the second battery 122 is greater than the weight of the first battery 121, when only the first battery 121 is arranged in the cordless vacuum cleaner, in order to increase the usage time for the cordless vacuum cleaner or increase the output of the cordless vacuum cleaner, the capacity of the first battery 121 or the number of battery cells included in the first battery 121 may be increased. When the capacity of the first battery 121 or the number of battery cells included in the first battery 121 is increased, the weight of the first battery 121 may increase. When the weight of the first battery 121 increases, the weight of the handle portion of the cordless vacuum cleaner may increase. When the weight of the handle portion of the cordless vacuum cleaner increases, the weight of the cordless vacuum cleaner perceived by the user using the cordless vacuum cleaner may increase much more. When the weight of the handle portion of the cordless vacuum cleaner increases, the user using the cordless vacuum cleaner may not be able to easily move the cordless vacuum cleaner.

When the first battery 121 and the second battery 122 are arranged in the cordless vacuum cleaner, the weight of the batteries may be distributed to the handle portion of the cordless vacuum cleaner and the brush portion of the cordless vacuum cleaner. When the cordless vacuum cleaner is moved, the brush portion of the cordless vacuum cleaner may remain in contact with the ground. Compared to the weight of the handle portion of the cordless vacuum cleaner, the weight of the brush portion of the cordless vacuum cleaner may have less of an impact on the weight of the cordless vacuum cleaner perceived by the user. When the second battery 122 becomes heavier while maintaining the combined weight of the first battery 121 and the second battery 122 constant, such that the weight of the cordless vacuum cleaner increased due to the batteries is distributed to the brush portion of the cordless vacuum cleaner, the weight of the cordless vacuum cleaner perceived by the user may be reduced.

The first battery 121 and the second battery 122 may be connected to each other through at least one power line 311 or 312. The at least one power line 311 or 312 may be arranged inside a pipe 310 between the first battery 121 and the second battery 122. The first battery 121 and the second battery 122 may be connected to each other through a first power line 311 and a second power line 312. The first power line 311 and the second power line 312 may be American Wire Gauge (AWG)-8 (AWG8) lines according to the AWG standard. The first power line 311 and the second power line 312 may transmit battery power. A third power line 313 may transmit brush power, which is a power source separate from the battery power. The third power line 313 may be arranged inside the pipe 310 between the first battery 121 and the second battery 122.

The first battery 121 and the second battery 122 may be connected to each other through at least one communication line 314 or 315. The at least one communication line 314 or 315 may be arranged inside the pipe 310 between the first battery 121 and the second battery 122. The first battery 121 and the second battery 122 may be connected to each other through a first communication line 314 and a second communication line 315. The first communication line 314 may be connected between the processor and the first battery 121. The second communication line 315 may be connected between the processor and the second battery 122. The first communication line 314 may be a reception line Rx through which the processor receives notification signals generated from the first battery 121 and the second battery 122. The second communication line 315 may be a transmission line Tx through which the processor transmits control signals to the first battery 121 and the second battery 122. The processor may individually receive a notification signal from each of the first battery 121 and the second battery 122 through at least one of the first communication line 314 and the second communication line 315. The processor may individually transmit a control signal to each of the first battery 121 and the second battery 122 through at least one of the first communication line 314 and the second communication line 315.

Hereinafter, the structure of arranging N batteries (where N is a natural number of 3 or more) in the main body of the cordless vacuum cleaner is described with reference to FIG. 4.

Figure 4:
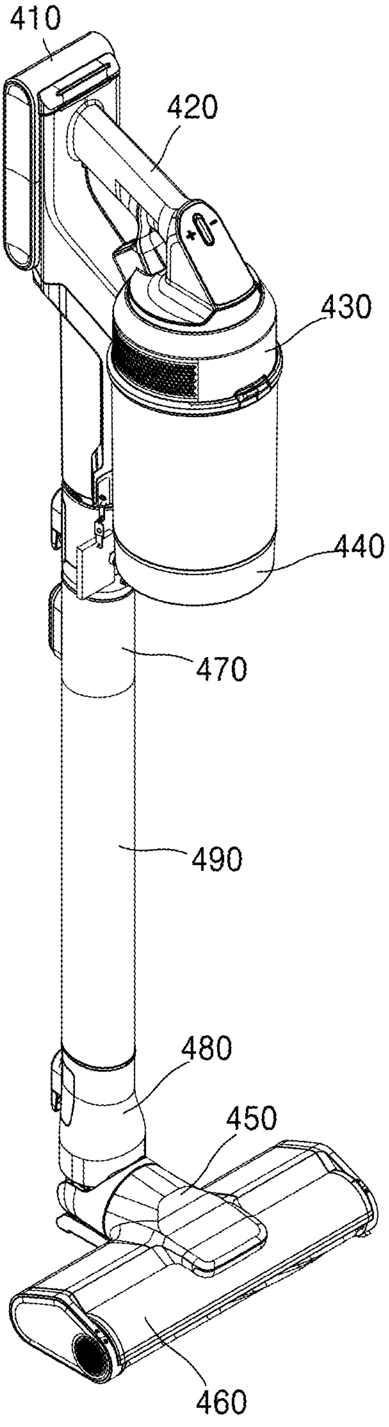
FIG. 4 is a diagram illustrating a plurality of batteries arranged in a cordless vacuum cleaner, according to an embodiment of the disclosure.

FIG. 4 is a diagram illustrating a plurality of batteries arranged in a cordless vacuum cleaner according to an embodiment of the disclosure.

Referring to FIG. 4, a plurality of batteries may be arranged in the cordless vacuum cleaner. The plurality of batteries may be arranged in a plurality of positions of the main body of the cordless vacuum cleaner. The plurality of batteries may be arranged in at least one of a first portion 410 to a sixth portion 460 of the main body of the cordless vacuum cleaner. However, the disclosure is not limited thereto, and the plurality of batteries may be distributed and arranged in a plurality of positions of the main body of the cordless vacuum cleaner. When the plurality of batteries are arranged in the plurality of positions of the main body of the cordless vacuum cleaner, the weight of the batteries may be distributed to the plurality of positions. Accordingly, even when the total capacity and total weight of the batteries are increased to increase the usage time and output, it may be difficult for a user to perceive the increase in the weight of the cordless vacuum cleaner.

The first portion 410 may be a rear head portion arranged on the rear surface of a dust container attached to the main body of the cordless vacuum cleaner. The first portion 410 may be a rear portion of the handle portion of the main body of the cordless vacuum cleaner. The first portion 410 may be a portion facing the user when the user moves the main body of the cordless vacuum cleaner. One of the plurality of batteries may be arranged on the inner or outer surface of the first portion 410. The battery arranged on the inner or outer surface of the first portion 410 may be a battery in the shape of a rectangular parallelepiped.

A second portion 420 may be a grip portion that the user holds when the user cleans by using the main body of the cordless vacuum cleaner. The second portion 420 may be a front portion of the handle portion of the main body of the cordless vacuum cleaner. The second portion 420 may be a portion facing the suction motor from the handle portion of the cordless vacuum cleaner. The second portion 420 may have a circular shape. One of the plurality of batteries may be arranged on the inner or outer surface of the second portion 420. The battery arranged on the inner or outer surface of the second portion 420 may be a cylindrical battery.

A third portion 430 may be the top of the suction motor. The third portion 430 may have a ring shape. One of the plurality of batteries may be arranged on the upper surface, side edge, or lower surface of the third portion 430. The battery arranged on the upper surface or lower surface of the third portion 430 may be a cylindrical battery of small thickness. The battery arranged on the side edge of the third portion 430 may be a ring-shaped battery.

A fourth portion 440 may be the bottom of the suction motor. The fourth portion 440 may have a ring shape. One of the plurality of batteries may be arranged on the upper surface, side edge, or lower surface of the fourth portion 440. The battery arranged on the upper surface or lower surface of the fourth portion 440 may be a thin cylindrical battery. The battery arranged on the side edge of the fourth portion 440 may be a ring-shaped battery.

A fifth portion 450 may be the top of the brush portion. The fifth portion 450 may cover the brush. One of the plurality of batteries may be arranged on the inner or upper surface of the fifth portion 450. The battery arranged on the upper surface of the fifth portion 450 may be an ultra-thin battery of small thickness.

The sixth portion 460 may be the bottom of the brush portion. The sixth portion 460 may be a portion facing the ground. One of the plurality of batteries may be arranged inside the sixth portion 460.

Accordingly, at least one of the plurality of batteries may be arranged in one of a station connector of the handle portion, the grip portion of the handle portion, the top of the suction motor, the bottom of the suction motor, the top of the brush portion, and the bottom of the brush portion. However, the portions where the plurality of batteries are arranged may not be limited thereto. Hereinafter, additional portions where the plurality of batteries may be arranged are described in relation to a pipe of the cordless vacuum cleaner.

The cordless vacuum cleaner may include a pipe. The pipe may connect the handle portion to the brush portion. The plurality of batteries may be arranged in one of a seventh portion 470, an eighth portion 480, and a ninth portion 490, in relation to the pipe of the cordless vacuum cleaner.

The seventh portion 470 may be a first connector that connects the pipe to the handle portion. One of the plurality of batteries may be arranged to surround the inner or outer surface of the seventh portion 470. The battery arranged on the inner or outer surface of the seventh portion 470 may be a cylindrical battery.

The eighth portion 480 may be a first connector that connects the pipe to the brush portion. One of the plurality of batteries may be arranged to surround the inner or outer surface of the eighth portion 480. The battery arranged on the inner or outer surface of the eighth portion 480 may be a cylindrical battery.

The ninth portion 490 may be an inner portion of the pipe. One of the plurality of batteries may be arranged on the inner surface of the pipe in the ninth portion 490. The battery arranged on the inner surface of the pipe in the ninth portion 490 may be a cylindrical battery.

Accordingly, at least one of the plurality of batteries may be arranged in one of the first connector that connects the pipe to the handle portion, a second connector that connects the pipe to the brush portion, and the inner portion of the pipe.

Each of the plurality of batteries may be attached to or detached from the main body. Each of the plurality of batteries may be attached to or detached from the first portion 410 to the ninth portion 490 of the main body. In order to set the total weight of the main body of the cordless vacuum cleaner and the perceived weight of the main body as felt by the user to a threshold weight or less, which allows the user to move the main body without discomfort, at least one of the plurality of batteries may be attached to the main body by selecting at least one arbitrary portion from among the first portion 410 to the ninth portion 490 of the main body. At least one of the plurality of batteries may be attached to the main body by selecting at least one arbitrary portion from among the first portion 410 to the ninth portion 490 of the main body such that the center of gravity of the main body of the cordless vacuum cleaner is set to a position desired by the user.

According to an embodiment of the disclosure, the weight of the batteries may be distributed in the cordless vacuum cleaner by arranging the plurality of batteries in different positions of the cordless vacuum cleaner, thereby allowing the user to move the main body more easily when using the cordless vacuum cleaner.

Hereinafter, a connection structure of power lines and communication lines of the cordless vacuum cleaner is described with reference to FIG. 5.

Figure 5:
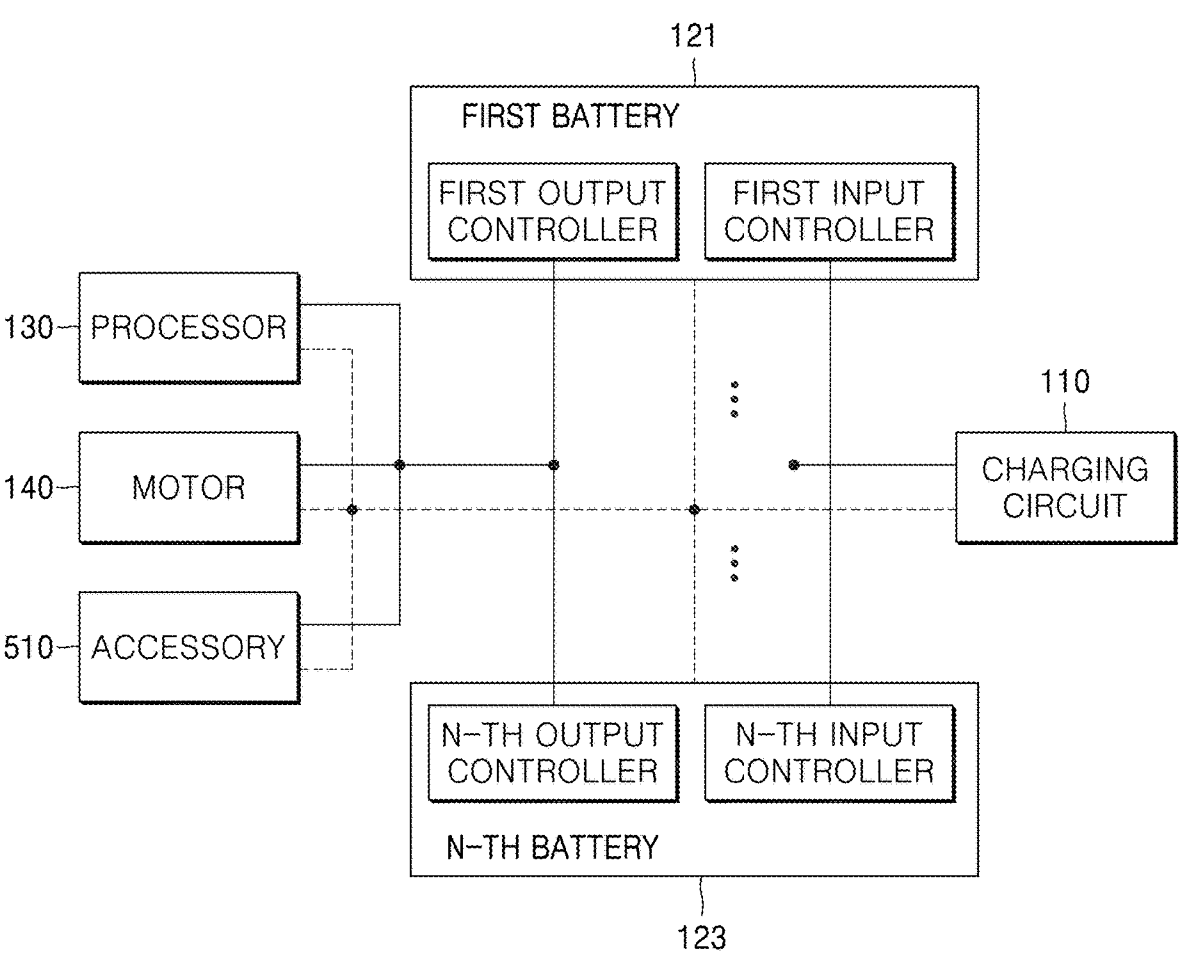
FIG. 5 is a diagram illustrating a connection structure of power lines and communication lines of a cordless vacuum cleaner, according to an embodiment of the disclosure.

FIG. 5 is a diagram illustrating a connection structure of power lines and communication lines of a cordless vacuum cleaner according to an embodiment of the disclosure.

Referring to FIG. 5, the power lines are shown as solid lines, and the communication lines are shown as dotted lines. The cordless vacuum cleaner may include a charging circuit 110, a first battery 121 to an N-th battery 123 (where N is a natural number of 3 or more), a processor 130, a motor 140, and an accessory 510. In FIG. 5, the motor 140 may be a suction motor.

The accessory 510 may include components that may assist the operation of the cordless vacuum cleaner and cleaning of a user. In an embodiment of the disclosure, the accessory 510 may include at least one of an attachable and detachable damp cloth, an attachable and detachable rag, a steam apparatus, a brush apparatus, and a vibration apparatus.

Each of the plurality of batteries 121 and 123 may include an output controller and an input controller. The first battery 121 may include a first output controller and a first input controller. The N-th battery 123 may include an N-th output controller and an N-th input controller. The output controller of each of the plurality of batteries 121 and 123 may control whether to discharge each of the plurality of batteries 121 and 123, and discharge speed and discharge amount of each of the plurality of batteries 121 and 123. The output controller of each of the plurality of batteries 121 and 123 may control an output current and an output voltage output from each of the plurality of batteries 121 and 123. The input controller of each of the plurality of batteries 121 and 123 may control whether to charge each of the plurality of batteries 121 and 123, and charge speed and charge amount of each of the plurality of batteries 121 and 123. The output controller of each of the plurality of batteries 121 and 123 may control an input current and an input voltage input to each of the plurality of batteries 121 and 123.

The input controller of each of the plurality of batteries 121 and 123 may be connected to the charging circuit 110 through power lines. The input controller of each of the plurality of batteries 121 and 123 may receive power from the charging circuit 110.

The output controller of each of the plurality of batteries 121 and 123 is connected to the processor 130, the motor 140, and the accessory 510 through power lines. The output controller of each of the plurality of batteries 121 and 123 may transmit power to the processor 130, the motor 140, and the accessory 510.

The processor 130 is connected to the charging circuit 110, the plurality of batteries 121 and 123, the motor 140, and the accessory 510 through communication lines. The processor 130 may receive state information from the charging circuit 110, the plurality of batteries 121 and 123, the motor 140, and the accessory 510. The processor 130 may transmit control signals to the charging circuit 110, the plurality of batteries 121 and 123, the motor 140, and the accessory 510.

The state information received by the processor 130 may include a residual capacity of each of the plurality of batteries 121 and 123. The processor 130 may individually control, based on the residual capacity of each of the plurality of batteries 121 and 123, whether to discharge each of the plurality of batteries 121 and 123, and the discharge speed and the discharge amount.

The state information received by the processor 130 may include output information about each of the plurality of batteries 121 and 123. The processor 130 may calculate, based on the output information about each of the plurality of batteries 121 and 123, remaining usage time for each of the plurality of batteries 121 and 123. The processor 130 may individually control, based on the remaining usage time for each of the plurality of batteries 121 and 123, whether to discharge each of the plurality of batteries 121 and 123, and the discharge speed and the discharge amount.

The processor 130 may individually supply a control signal to each of the plurality of batteries 121 and 123. The processor 130 may individually control whether to discharge each of the plurality of batteries 121 and 123, and the discharge speed and the discharge amount.

Hereinafter, a connection structure of power lines and communication lines of the cordless vacuum cleaner is described with reference to FIG. 6.

Figure 6:
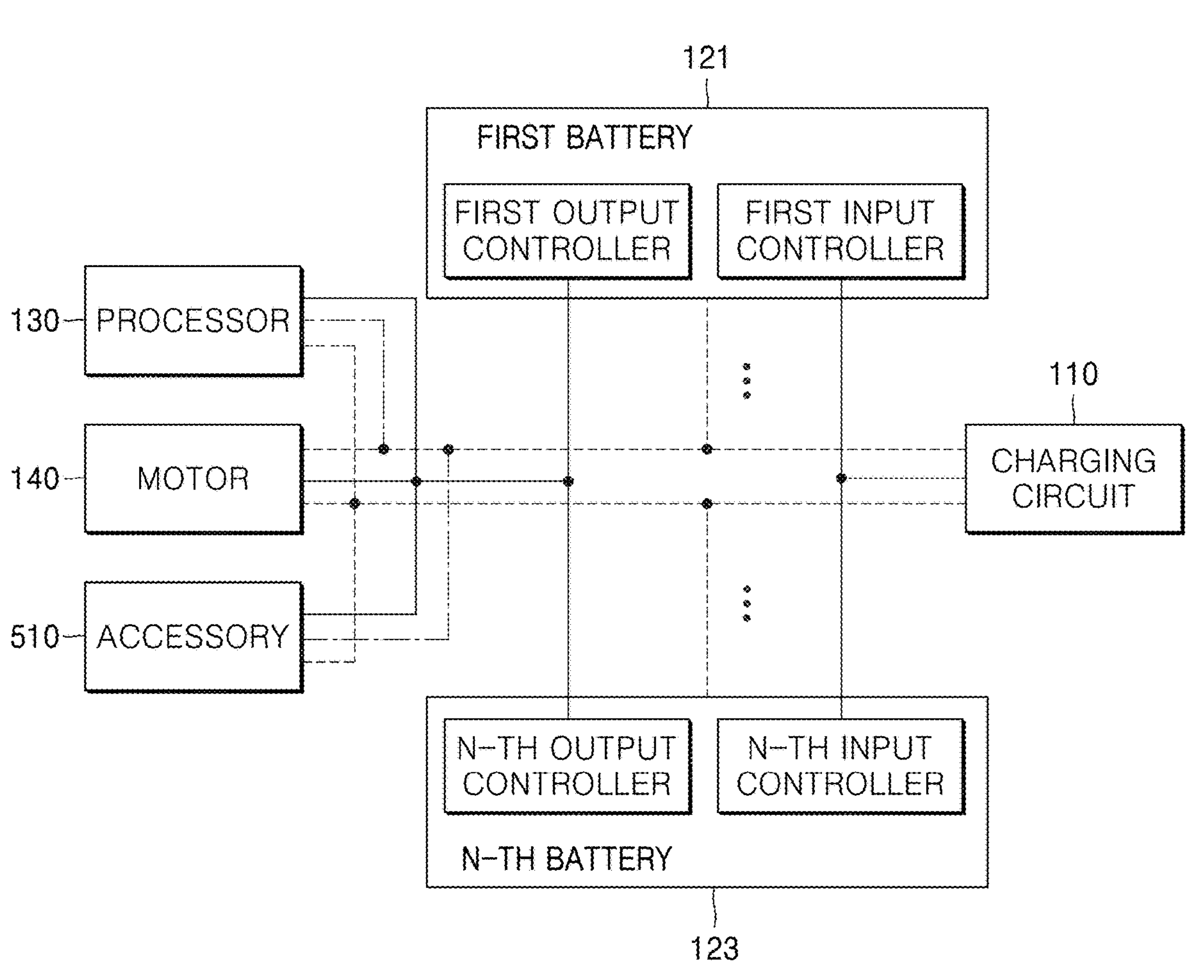
FIG. 6 is a diagram illustrating a connection structure of power lines and communication lines of a cordless vacuum cleaner, according to an embodiment of the disclosure.

FIG. 6 is a diagram illustrating a connection structure of power lines and communication lines of a cordless vacuum cleaner according to an embodiment of the disclosure.

Referring to FIG. 6, the power lines are shown as solid lines, and the communication lines are shown as dotted lines. The cordless vacuum cleaner may include a charging circuit 110, a first battery 121, an N-th battery 123, a processor 130, a motor 140, and an accessory 510. In FIG. 6, the motor 140 may be a suction motor.

The accessory 510 may include components that may assist the operation of the cordless vacuum cleaner and cleaning of a user. The accessory 510 may include at least one of an attachable and detachable damp cloth, an attachable and detachable rag, a steam apparatus, a brush apparatus, and a vibration apparatus.

Each of the plurality of batteries 121 and 123 may include an output controller and an input controller. Each of the first battery 121 and the N-th battery 123 may include an output controller and an input controller. The first battery 121 may include a first output controller and a first input controller. The N-th battery 123 may include an N-th output controller and an N-th input controller. The output controller of each of the first battery 121 and the N-th battery 123 may control whether to discharge each of the first battery 121 and the N-th battery 123, and discharge speed and discharge amount. The output controller of each of the first battery 121 and the N-th battery 123 may control an output current and an output voltage output from each of the first battery 121 and the N-th battery 123. The input controller of each of the first battery 121 and the N-th battery 123 may control whether to charge each of the first battery 121 and the N-th battery 123, and charge speed and charge amount. The output controller of each of the first battery 121 and the N-th battery 123 may control an input current and an input voltage input to each of the first battery 121 and the N-th battery 123.

The input controller of each of the first battery 121 and the N-th battery 123 is connected to the charging circuit 110 through a power line. The input controller of each of the first battery 121 and the N-th battery 123 may receive power from the charging circuit 110.

The output controller of each of the first battery 121 and the N-th battery 123 is connected to the processor 130, the motor 140, and the accessory 510 through power lines. The output controller of each of the first battery 121 and the N-th battery 123 may transmit power to the processor 130, the motor 140, and the accessory 510.

The processor 130 is connected to the charging circuit 110, the first battery 121, the second battery 122, the motor 140, and the accessory 510 through communication lines. The processor 130 may receive state information from the charging circuit 110, the first battery 121, the N-th battery 122, the motor 140, and the accessory 510. The processor 130 may transmit control signals to the charging circuit 110, the first battery 121, the N-th battery 123, the motor 140, and the accessory 510.

The state information received by the processor 130 may include a residual capacity of each of the first battery 121 and the N-th battery 123. The processor 130 may individually control, based on the residual capacity of each of the first battery 121 and the N-th battery 123, whether to discharge each of the first battery 121 and the N-th battery 123, and the discharge speed and the discharge amount of each of the first battery 121 and the N-th battery 123.

The state information received by the processor 130 may include output information about each of the first battery 121 and the N-th battery 123. The processor 130 may calculate, based on the output information about each of the first battery 121 and the N-th battery 123, remaining usage time for each of the first battery 121 and the N-th battery 123. The processor 130 may individually control, based on the remaining usage time for each of the first battery 121 and the N-th battery 123, whether to discharge each of the first battery 121 and the N-th battery 123, and the discharge speed and the discharge amount of each of the first battery 121 and the N-th battery 123.

The processor 130 may individually supply a control signal to each of the first battery 121 and the N-th battery 123. The processor 130 may individually control whether to discharge each of the first battery 121 and the N-th battery 123, and the discharge speed and the discharge amount.

The processor 130 and each of the plurality of batteries 121 and 123 may be individually connected through a plurality of communication lines. The processor 130 and the first battery 121 may be connected to each other through a first communication line. The processor 130 and the N-th battery 123 may be connected to each other through an N-th communication line. In order to individually supply the control signal to each of the plurality of batteries 121 and 123, the processor 130 and each of the plurality of batteries 121 and 123 may be connected through a different communication line. More particularly, when there are two batteries 121 and 123, the additional cost of connecting the first battery 121 and the N-th battery 123 with separate two communication lines may be reduced. When there are two batteries 121 and 123, the possibility that the control signal controlling each of the first battery 121 and the N-th battery 123 is transmitted to the other battery may be blocked, thereby increasing the independence between the first battery 121 and the N-th battery 123.

Hereinafter, operations included in a method of controlling the cordless vacuum cleaner is described with reference to FIG. 7.

Figure 7:
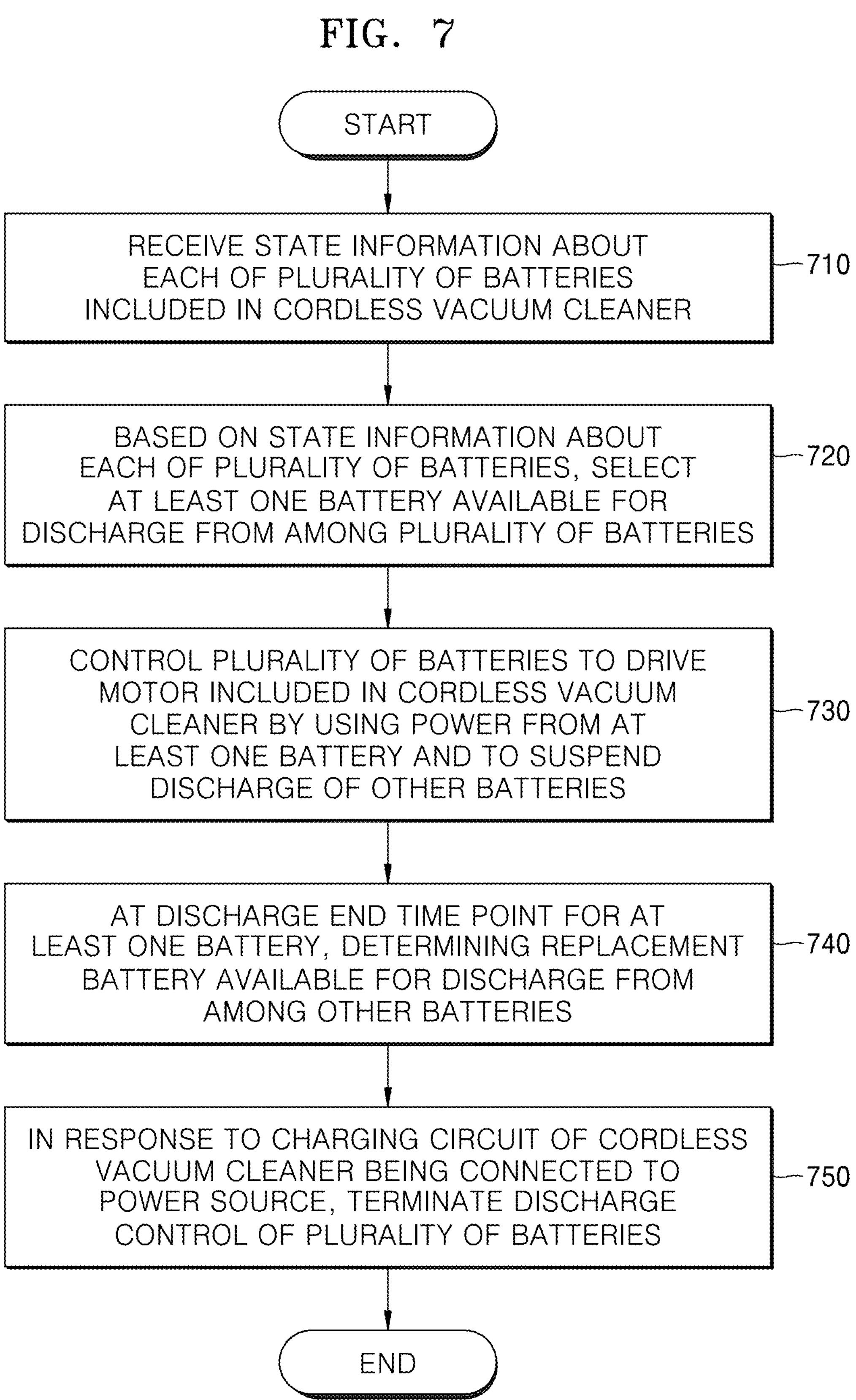
FIG. 7 is a flowchart illustrating a method of controlling a cordless vacuum cleaner, according to an embodiment of the disclosure.

FIG. 7 is a flowchart illustrating a method of controlling a cordless vacuum cleaner according to an embodiment of the disclosure.

Referring to FIG. 7, according to an embodiment of the disclosure, in operation 710, the processor may receive state information about each of a plurality of batteries included in the cordless vacuum cleaner.

The state information about each of the plurality of batteries may include a battery discharge amount of each of the plurality of batteries. The battery discharge amount of each of the plurality of batteries may be calculated based on a change in capacity of each of the plurality of batteries, a change in voltage of each of the plurality of batteries, and a usage amount of each of the plurality of batteries. The processor may display, on the display, the battery discharge amount of each of the plurality of batteries.

In an embodiment of the disclosure, the state information about each of the plurality of batteries may include a life state of each of the plurality of batteries. The life state may refer to a remaining period of time during which each of the plurality of batteries may operate normally. The life state may refer to a remaining period of time during which each of the plurality of batteries may output power while being discharged normally. The life state may refer to a remaining period of time during which each battery may normally supply power to the main body while having a specified range of discharge amounts. In an embodiment of the disclosure, the life state may be calculated based on a usage period of time for each of the plurality of batteries, a degree of deterioration of each of the plurality of batteries, and a usage pattern of each of the plurality of batteries.

According to an embodiment of the disclosure, in operation 720, the processor may select, based on the state information about each of the plurality of batteries, at least one battery available for discharge from among the plurality of batteries. The at least one battery available for discharge may be a battery usable for the operation of the cordless vacuum cleaner. The cordless vacuum cleaner may drive the motor by discharging the at least one battery available for discharge and using electric energy stored in the battery. The processor may select, based on the state information, at least one battery that is desirable to be discharged and used for the operation of the cordless vacuum cleaner at the current time point.

According to an embodiment of the disclosure, in operation 730, the processor may control the plurality of batteries to drive the motor of the cordless vacuum cleaner by using power from the at least one battery and to suspend the discharge of the other batteries. The processor may control the motor of the cordless vacuum cleaner to be driven by using only the at least one selected battery. The processor may transmit a control signal to only the at least one selected battery to discharge only the at least one selected battery. The processor may control batteries other than the at least one selected battery to be in a discharge standby state such that the other batteries are not discharged.

The processor may individually control the discharge of each of the plurality of batteries. The processor may select, from among the plurality of batteries, only a battery optimized for discharge and use and discharge the battery, thereby improving the usage efficiency of the plurality of batteries. The processor may select, from among the plurality of batteries, only the battery optimized for discharge and use and discharge the battery, thereby preventing unnecessary discharge of batteries other than the selected battery.

According to an embodiment of the disclosure, in operation 740, the processor may determine, at a discharge end time point for the at least one battery, a replacement battery available for discharge from among the other batteries. The processor may discharge and use the at least one battery until the discharge end time point. After the at least one battery has been used until the discharge end time point, the processor may determine a replacement battery available for discharge from among the other batteries. The processor may drive the motor of the cordless vacuum cleaner by using the replacement battery after the discharge end time point for the at least one battery.

The processor may control to terminate, among the plurality of batteries, the discharge of a battery having a voltage less than or equal to a threshold voltage. The processor may calculate a time point at which the at least one selected battery has a voltage less than or equal to the threshold voltage during discharge and use. The processor may determine, as a discharge end time point, the time point at which the at least one selected battery has a voltage less than or equal to the threshold voltage.

According to an embodiment of the disclosure, in operation 750, in response to the charging circuit of the cordless vacuum cleaner being connected to a power source, the processor may terminate the discharge control of the plurality of batteries. When the charging circuit of the cordless vacuum cleaner is connected to the power source, the plurality of batteries may be charged with power supplied from the charging circuit. When the charging circuit of the cordless vacuum cleaner is connected to the power source, the processor may terminate unnecessary discharge control.

Hereinafter, a control flow of the cordless vacuum cleaner is described with reference to FIG. 8.

FIG. 8 is a block diagram illustrating a control flow of a cordless vacuum cleaner according to an embodiment of the disclosure.

Referring to FIG. 8, the first battery 121 may include a first discharge cutoff circuit 810 and a first internal control circuit 811. The second battery 122 may include a second discharge cutoff circuit 820 and a second internal control circuit 821. The processor 130 may include a battery selection circuit 830 and a balancing circuit 840.

The battery selection circuit 830 may be connected to the first discharge cutoff circuit 810 and the second discharge cutoff circuit 820. The battery selection circuit 830 may transmit a cutoff release signal to a discharge cutoff circuit included in at least one battery available for discharge, among the first discharge cutoff circuit 810 and the second discharge cutoff circuit 820. The cutoff release signal may control the discharge cutoff circuit to stop cutting off discharge and allow a battery to which the discharge cutoff circuit belongs to be used while being discharged. For example, when the first battery 121 is selected as a battery available for discharge, the battery selection circuit 830 may allow the first battery 121 to be used by transmitting the cutoff release signal to the first discharge cutoff circuit 810. The first battery 121 may transmit power to the brush motor 214 and the suction motor 140 while being discharged. The battery selection circuit 830 may transmit standby signals to discharge cutoff circuits of batteries other than the at least one battery available for discharge and cause the other batteries to remain in a discharge cutoff state.

The balancing circuit 840 may be connected to the first internal control circuit 811 and the second internal control circuit 821. The balancing circuit 840 may transmit an output signal to an internal control circuit included in the at least one battery available for discharge, among the first internal control circuit 811 and the second internal control circuit 821. The output signal may control the internal control circuit to output electric energy stored in the battery. For example, when the first battery 121 is selected as a battery available for discharge, the balancing circuit 840 may cause the first battery 121 to output electric energy by transmitting an output signal to the first internal control circuit 811. The first battery 121 may transmit power to the brush motor 214 and the suction motor 140 while being discharged. The balancing circuit 840 may transmit standby signals to internal control circuits of batteries other than the at least one battery available for discharge and cause the other batteries to remain in an output standby state.

Hereinafter, more detailed operations of controlling the cordless vacuum cleaner are described with reference to FIG. 9.

Figure 9:
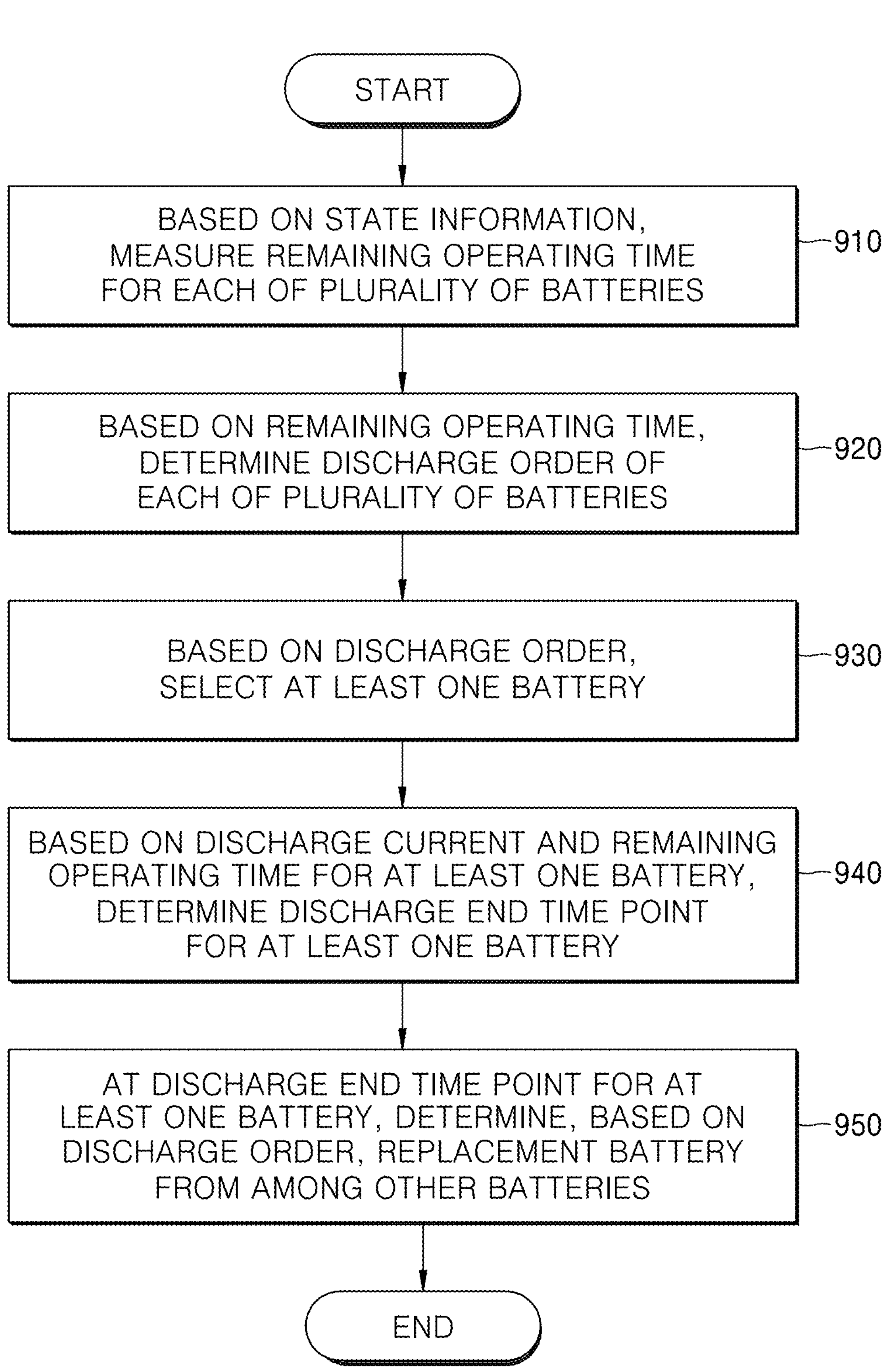
FIG. 9 is a flowchart illustrating a method of controlling a cordless vacuum cleaner, according to an embodiment of the disclosure.

FIG. 9 is a flowchart illustrating a method of controlling a cordless vacuum cleaner according to an embodiment of the disclosure.

Referring to FIG. 9, according to an embodiment of the disclosure, in operation 910, the processor may measure remaining operating time for each of a plurality of batteries based on state information. The remaining operating time may refer to operating time remaining until each battery, which has been selected and used, is completely discharged. The operation of measuring the remaining operating time may be a detailed operation included in operation 720 of FIG. 7, that is, the operation of selecting, based on the state information, at least one battery available for discharge from among the plurality of batteries. The processor may calculate, based on the state information, the remaining operating time for each of the plurality of batteries.

According to an embodiment of the disclosure, in operation 920, the processor may determine a discharge order of each of the plurality of batteries based on the remaining operating time. The discharge order may be a priority for which battery among the plurality of batteries is selected first. Operation 920 of determining the discharge order may be a detailed operation included in operation 720 of FIG. 7, that is, the operation of selecting, based on the state information, at least one battery available for discharge from among the plurality of batteries. The processor may assign, based on the remaining operating time, a discharge order to each of the plurality of batteries.

According to an embodiment of the disclosure, in operation 930, the processor may select at least one battery based on the discharge order. The processor may select a battery with a first priority in the discharge order, which is the highest discharge order. After the battery with the first priority in the discharge order has been used until a discharge end time point, the processor may select, as a replacement battery, a battery with a second priority in the discharge order.

In an embodiment of the disclosure, the processor may assign a higher discharge order to a battery having a longer remaining operating time among the plurality of batteries. The processor may assign a first priority to a battery having the longest remaining operating time among the plurality of batteries, and then assign a second priority to a battery having the second longest remaining operating time.

In an embodiment of the disclosure, the processor may assign a higher discharge order to a battery having a higher SOC among the plurality of batteries. The processor may assign a first priority to a battery having the highest SOC among the plurality of batteries, and then assign a second priority to a battery having the second highest SOC.

According to an embodiment of the disclosure, in operation 940, the processor may determine a discharge end time point for the at least one battery based on a discharge current and remaining operating time for the at least one battery. The discharge current may be a current actually output while the at least one battery is discharged during use. Operation 940 of determining the discharge end time point may be a detailed operation included in operation 740 of FIG. 7, that is, the operation of determining, at a discharge end time point for the at least one battery, a replacement battery available for discharge from among the other batteries. The processor may determine a discharge end time point for the first-priority battery in use.

According to an embodiment of the disclosure, in operation 950, the processor may determine, based on the discharge order, a replacement battery from among the other batteries at the discharge end time point for the at least one battery. The processor may determine, as a replacement battery, the second-priority battery in the discharge order at the discharge end time point for the first-priority battery.

In an embodiment of the disclosure, the processor may individually perform input/output of power and input/output of a communication signal with respect to each of the plurality of batteries. The processor may control the plurality of batteries such that, when the first-priority battery is used according to the discharge order, power is output only from the first-priority battery, and batteries other than the first-priority battery remain in the discharge standby state. The processor may control the plurality of batteries such that, when the use of the first-priority battery is terminated according to the discharge order and the second-priority battery is started according to the discharge order, power is output only from the second-priority battery, and batteries other than the first-priority battery remain in the discharge standby state.

According to an embodiment of the disclosure, the cordless vacuum cleaner may be operated by selecting, based on state information, at least one battery optimized for discharge at the current time point from among the plurality of batteries, thereby increasing the usage efficiency of the batteries.

According to an embodiment of the disclosure, a cordless vacuum cleaner may include a main body, a suction fan, a suction motor arranged inside the main body and configured to rotate the suction fan, a charging circuit configured to charge the main body, a plurality of batteries charged and discharged through the charging circuit, and a processor configured to control each of the plurality of batteries, wherein the processor may be further configured to, based on state information about each of the plurality of batteries, control discharge of each of the plurality of batteries, and the state information may include a battery discharge amount of each of the plurality of batteries.

In an embodiment of the disclosure, a motor may include the suction motor configured to provide suction power to the main body and a brush motor configured to rotate a brush of the main body, the plurality of batteries may include a first battery and a second battery, the first battery may be arranged adjacent to the suction motor, and the second battery may be arranged adjacent to the brush motor.

In an embodiment of the disclosure, the first battery may be arranged adjacent to a handle portion of the main body, and the second battery may be arranged adjacent to a brush portion including the brush.

In an embodiment of the disclosure, a first capacity of the first battery and a second capacity of the second battery may be at different levels.

In an embodiment of the disclosure, the first battery and the second battery may be connected to each other through at least one power line and at least one communication line.

In an embodiment of the disclosure, at least one of the plurality of batteries may be arranged in one of a rear head portion, a grip portion of the handle portion, a top of the suction motor, a bottom of the suction motor, a top of the brush portion, and a bottom of the brush portion, the rear head portion being arranged on a rear surface of a dust container attached to the main body.

In an embodiment of the disclosure, the cordless vacuum cleaner may further include a pipe configured to connect the handle portion to the brush portion, wherein at least one of the plurality of batteries may be arranged in one of a first connector, a second connector, and an inner portion of the pipe, the first connector being configured to connect the pipe to the handle portion, and the second connector being configured to connect the pipe to the brush portion.

In an embodiment of the disclosure, the state information may include life information about each of the plurality of batteries.

In an embodiment of the disclosure, the state information may include output information about each of the plurality of batteries.

In an embodiment of the disclosure, the processor and each of the plurality of batteries may be individually connected to each other through a plurality of communication lines.

According to an embodiment of the disclosure, a method of controlling a cordless vacuum cleaner including a main body, a suction fan, a suction motor arranged inside the main body and configured to rotate the suction fan, a charging circuit configured to charge the main body, a plurality of batteries charged and discharged through the charging circuit, and a processor configured to control each of the plurality of batteries may include receiving, by the processor, state information about each of the plurality of batteries included in the cordless vacuum cleaner, wherein the processor may be further configured to, based on the state information about each of the plurality of batteries, control discharge of each of the plurality of batteries, and the state information may include a battery discharge amount of each of the plurality of batteries.

In an embodiment of the disclosure, the method may further include, after the receiving of the state information about each of the plurality of batteries, based on the state information about each of the plurality of batteries, selecting at least one battery available for discharge from among the plurality of batteries, and controlling the plurality of batteries to drive a motor of the cordless vacuum cleaner by using power from the at least one battery and to suspend discharge of the other batteries.

In an embodiment of the disclosure, the method may further include, after the controlling of the plurality of batteries to drive the motor of the cordless vacuum cleaner by using the power from the at least one battery and to suspend the discharge of the other batteries, at a discharge end time point for the at least one battery, determining a replacement battery available for discharge from among the other batteries.

In an embodiment of the disclosure, the method may further include, in response to the charging circuit of the cordless vacuum cleaner being connected to a power source, terminating discharge control of the plurality of batteries.

In an embodiment of the disclosure, the method may further include, among the plurality of batteries, controlling to terminate discharge of a battery having a voltage less than or equal to a threshold voltage.

In an embodiment of the disclosure, the selecting of the at least one battery available for discharge from among the plurality of batteries based on the state information may include, based on the state information, measuring a remaining operating time for each of the plurality of batteries.

In an embodiment of the disclosure, the selecting of the at least one battery available for discharge from among the plurality of batteries based on the state information may further include, based on the remaining operating time, determining a discharge order of each of the plurality of batteries, and based on the discharge order, selecting the at least one battery.

In an embodiment of the disclosure, the determining of the discharge order of each of the plurality of batteries based on the remaining operating time may include, among the plurality of batteries, assigning a higher discharge order to a battery having a longer remaining operating time.

In an embodiment of the disclosure, the determining of the discharge order of each of the plurality of batteries based on the remaining operating time may include, among the plurality of batteries, assigning a higher discharge order to a battery having a higher state of charge (SOC).

In an embodiment of the disclosure, the determining of the replacement battery available for discharge from among the other batteries at the discharge end time point for the at least one battery may include, based on a discharge current and a remaining operating time for the at least one battery, determining the discharge end time point for the at least one battery, and at the discharge end time point for the at least one battery, determining, based on the discharge order, the replacement battery from among the other batteries.

According to an embodiment of the disclosure, the weight of batteries may be distributed in the cordless vacuum cleaner by arranging the plurality of batteries in different positions of the cordless vacuum cleaner, thereby allowing a user to move the main body more easily when using the cordless vacuum cleaner.

According to an embodiment of the disclosure, the cordless vacuum cleaner may be operated by selecting, based on state information, at least one battery optimized for discharge at the current time point from among the plurality of batteries, thereby increasing the usage efficiency of the batteries.

The method according to an embodiment of the disclosure may be implemented in the form of program instructions executable through various computer means and recorded on a computer-readable medium. The computer-readable medium may include program commands, data files, data structures, or the like, alone or in combination. The program commands recorded on the medium may be those specifically designed and configured for the disclosure or may be known and available to those of ordinary skill in computer software. Examples of the computer-readable recording medium include a magnetic medium, such as a hard disk, a floppy disk, and a magnetic tape, an optical medium, such as compact disk read-only memory (CD-ROM) and digital versatile disk (DVD), a magneto-optical medium, such as a floptical disk, and a hardware device specifically configured to store and execute program commands, such as read only memory (ROM), random access memory (RAM), and flash memory. Examples of the program commands include high-level language code executable by a computer by using an interpreter or the like as well as machine language code, such as those generated by a complier.

Some embodiments of the disclosure may also be realized in a form of a recording medium including instructions executable by a computer, such as a program module executed by a computer. The computer-readable recording medium may be any available medium which is accessible by a computer, and may include a volatile or nonvolatile medium and a detachable or non-detachable medium. In addition, the computer-readable recording medium may include both a computer storage medium and a communication medium. Examples of the computer storage medium include all volatile and nonvolatile media and separable and non-separable media, which have been implemented by an arbitrary method or technology, for storing information, such as computer-readable instructions, data structures, program modules, and other data. The communication medium typically includes computer-readable instructions, data structures, program modules, other types of data in a modulated data signal, such as carrier waves, or other transmission mechanisms, and includes any information delivery media. In addition, some embodiments of the disclosure may be implemented as a computer program or a computer program product including computer-executable instructions, such as a computer program executed by a computer.

A machine-readable storage medium may be provided in the form of a non-transitory storage medium. In this regard, the "non-transitory storage medium" simply means that the storage medium is a tangible apparatus and does not include a signal (e.g., an electromagnetic wave), but this term does not differentiate between where data is semi-permanently stored in the storage medium and where the data is temporarily stored in the storage medium. For example, the "non-transitory storage medium" may include a buffer in which data is temporarily stored.

According to an embodiment of the disclosure, the method according to various embodiments provided in the document may be provided by being included in a computer program product. The computer program product may be traded as a product between a seller and a buyer. The computer program product may be distributed in the form of a machine-readable storage medium (e.g., a CD-ROM), or distributed (e.g., downloaded or uploaded) through an application store, or directly or online between two user devices (e.g., smart phones). In the case of online distribution, at least a portion of a computer program product (e.g., a downloadable application) may be temporarily stored in a machine-readable storage medium, such as memory of a manufacturer's server, an application store's server, or a relay server, or may be temporarily generated.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a cordless vacuum cleaner comprising a main body, a suction fan, a suction motor arranged inside the main body and configured to rotate the suction fan, a plurality of batteries charged and discharged through a charging circuit, memory storing one or more computer programs, and one or more processors communicatively coupled to the suction motor, the charging circuit, the plurality of batteries, and the memory, the method comprising:

receiving, by the processor, state information about each of the plurality of batteries included in the cordless vacuum cleaner, selecting, based on the state information about each of the plurality of batteries, a battery having a longest life of the plurality of batteries, controlling, by the one or more processors, the selected battery to discharge for operating the suction motor, and in response to the controlling of the selected battery for operating the suction motor, controlling to suspend discharging of batteries of the plurality of batteries other than the selected battery, wherein the state information comprises a battery discharge amount and a life state of each of the plurality of batteries.

2. The method of claim 1, to control the discharge of each of the plurality of batteries, further comprising, at a discharge end time point for the at selected battery, determining a replacement battery available for discharge from among the other batteries.

3. The method of claim 1, further comprising, in response to the charging circuit of the cordless vacuum cleaner being connected to a power source, terminating discharge control of the plurality of batteries.

4. The method of claim 1, further comprising, among the plurality of batteries, controlling to terminate discharge of a battery having a voltage less than or equal to a threshold voltage.

5. The method of claim 1, wherein the battery discharge amount comprises life information about each of the plurality of batteries.

6. The method of claim 1, wherein the battery discharge amount comprises output information about each of the plurality of batteries.

7. One or more non-transitory computer-readable storage media storing one or more computer programs including computer-executable instructions that, when executed by one or more processors individually or collectively, cause a cordless vacuum cleaner comprising a main body, a suction fan, a suction motor arranged inside the main body and configured to rotate the suction fan, a plurality of batteries charged and discharged through a charging circuit, and the one or more processors communicatively coupled to the suction motor, the charging circuit, the plurality of batteries, and the memory, to perform operations, the operations comprising:

receiving, by the processor, state information about each of the plurality of batteries included in the cordless vacuum cleaner, selecting, based on the state information about each of the plurality of batteries, a battery having a longest life of the plurality of batteries, controlling, by the one or more processors, the selected battery to discharge for operating the suction motor, and in response to the controlling of the selected battery for operating the suction motor, controlling to suspend discharging of batteries of the plurality of batteries other than the selected battery, wherein the state information comprises a battery discharge amount and a life state of each of the plurality of batteries.

8. A cordless vacuum cleaner comprising:

a main body;

a suction fan;

a suction motor arranged inside the main body and configured to rotate the suction fan;

a plurality of batteries charged and discharged through a charging circuit;

memory storing one or more computer programs; and one or more processors communicatively coupled to the suction motor, the charging circuit, the plurality of batteries, and the memory, wherein the one or more computer programs include computer-executable instructions that, when executed by the one or more processors individually or collectively, cause the cordless vacuum cleaner to:

select, based on state information about each of the plurality of batteries, a battery having a longest life among the plurality of batteries, control the selected battery to discharge for operating the suction motor, and in response to the controlling of the selected battery for operating the suction motor, control to suspend discharging of batteries of the plurality of batteries other than the selected battery, and wherein the state information comprises a battery discharge amount and a life state of each of the plurality of batteries.

9. The cordless vacuum cleaner of claim 8, wherein the state information comprises life information about each of the plurality of batteries.

10. The cordless vacuum cleaner of claim 8, wherein the state information comprises output information about each of the plurality of batteries.

11. The cordless vacuum cleaner of claim 8, wherein the processor and each of the plurality of batteries are individually connected to each other through a plurality of communication lines.

12. The cordless vacuum cleaner of claim 8, wherein the one or more computer programs further include computer-executable instructions that, when executed by the one or more processors individually or collectively, cause the cordless vacuum cleaner to control the selected battery to operate the suction motor with a normally supplied power corresponding to a predefined range of discharge amounts to the main body, from the selected battery of the plurality of batteries.

13. The cordless vacuum cleaner of claim 8, further comprising:

a brush motor configured to rotate a brush of the main body, wherein the plurality of batteries comprise a first battery and a second battery, wherein the first battery is arranged adjacent to the suction motor, and wherein the second battery is arranged adjacent to the brush motor.

14. The cordless vacuum cleaner of claim 13, wherein a first capacity of the first battery and a second capacity of the second battery are at different levels.

15. The cordless vacuum cleaner of claim 13, wherein the first battery and the second battery are connected to each other through at least one power line and at least one communication line.

16. The cordless vacuum cleaner of claim 13, wherein the first battery is arranged adjacent to a handle portion of the main body, and wherein the second battery is arranged adjacent to a brush portion including the brush.

17. The cordless vacuum cleaner of claim 16, wherein at least one of the plurality of batteries is arranged in one of a rear head portion, a grip portion of the handle portion, a top of the suction motor, a bottom of the suction motor, a top of the brush portion, and a bottom of the brush portion, the rear head portion being arranged on a rear surface of a dust container attached to the main body.

18. The cordless vacuum cleaner of claim 16, further comprising:

a pipe configured to connect the handle portion to the brush portion, wherein at least one of the plurality of batteries is arranged in one of a first connector, a second connector, and an inner portion of the pipe, the first connector being configured to connect the pipe to the handle portion, and the second connector being configured to connect the pipe to the brush portion.

* * * * *